No. 788,123. PATENTED APR. 25, 1905.
F. H. VAN HOUTEN.
DOUGH DIVIDING MACHINE.
APPLICATION FILED MAY 13, 1904.
3 SHEETS—SHEET 1.
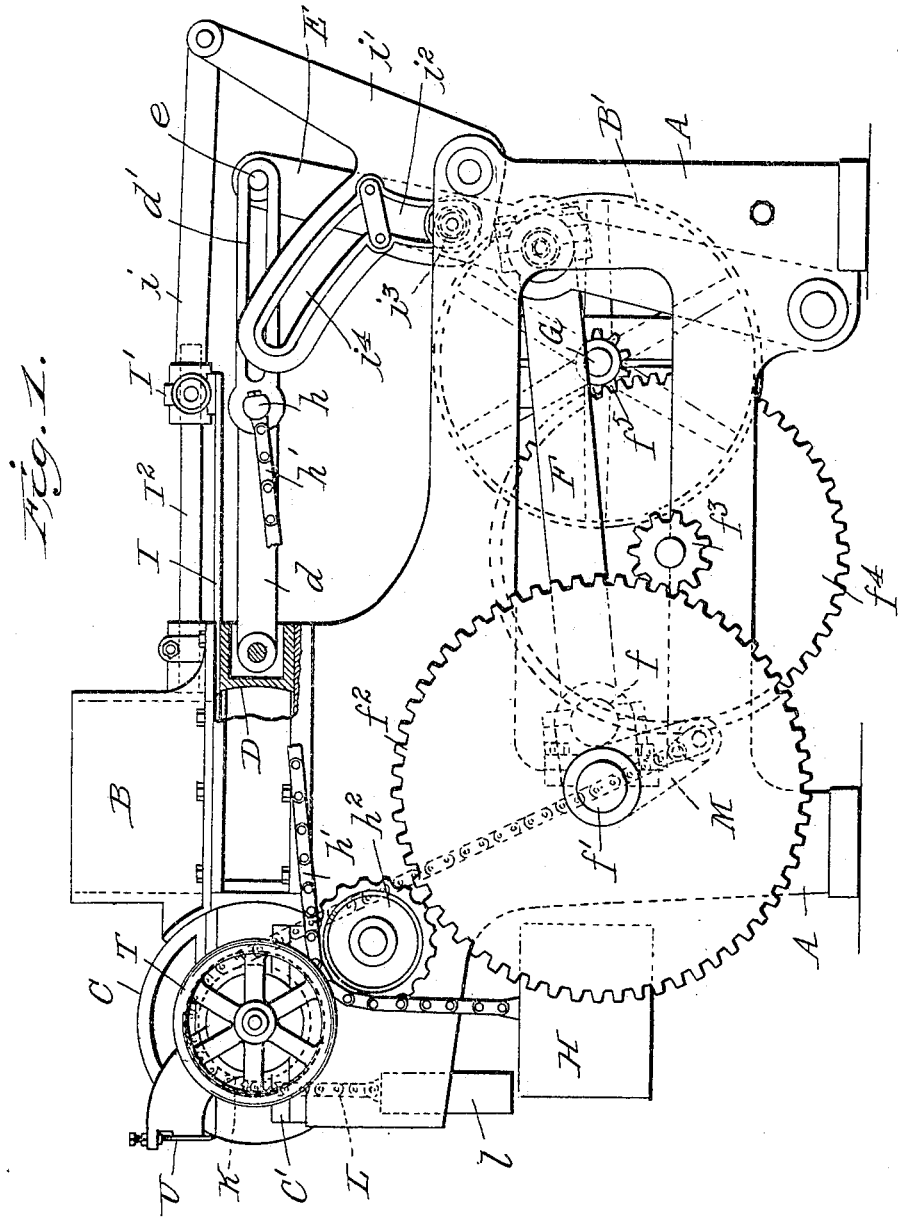
Witnesses
Edwin L. Yewell
Thomas Durant
Inventor
Frank H. Van Houten,
By Church & Church
his Attorneys

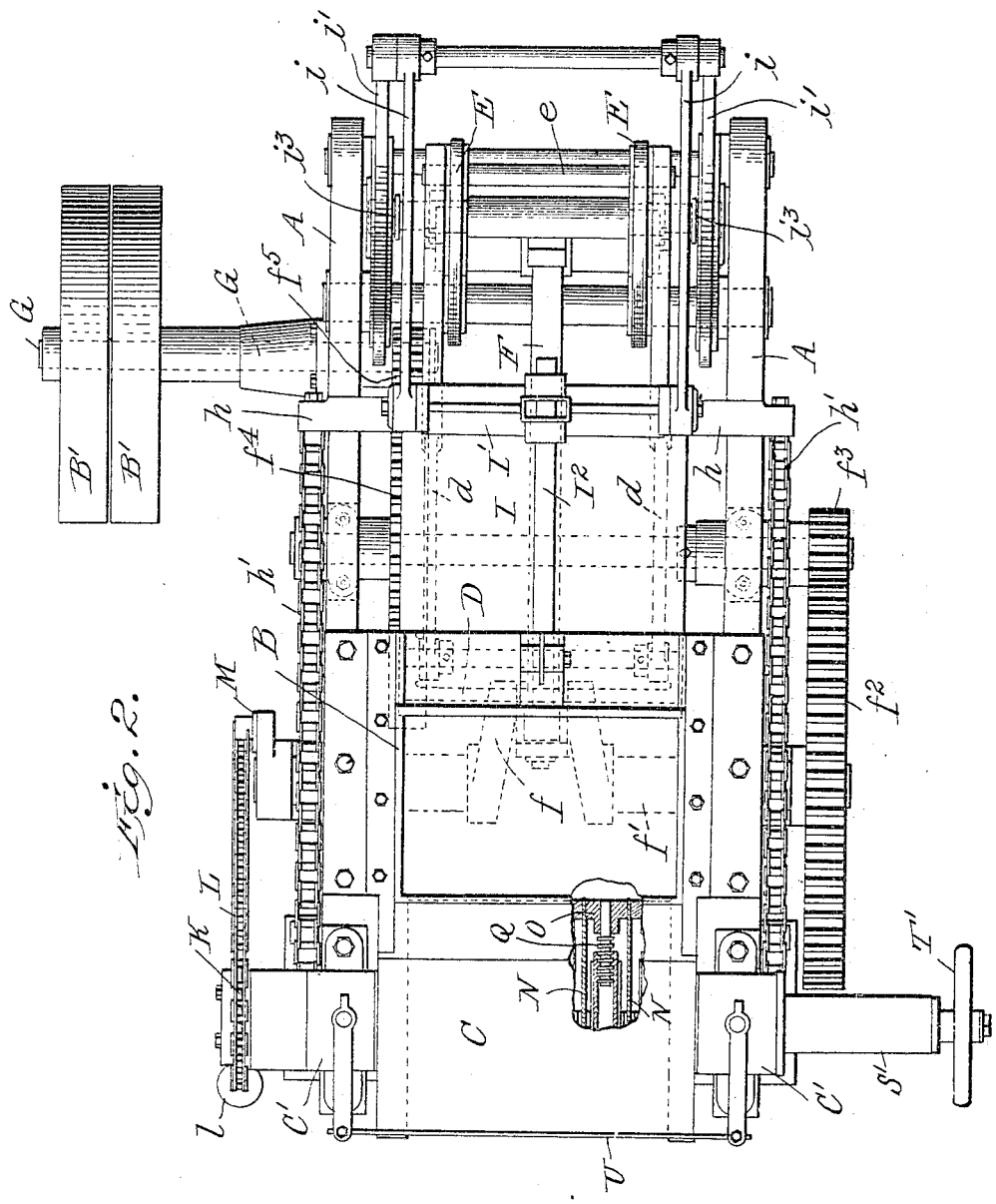

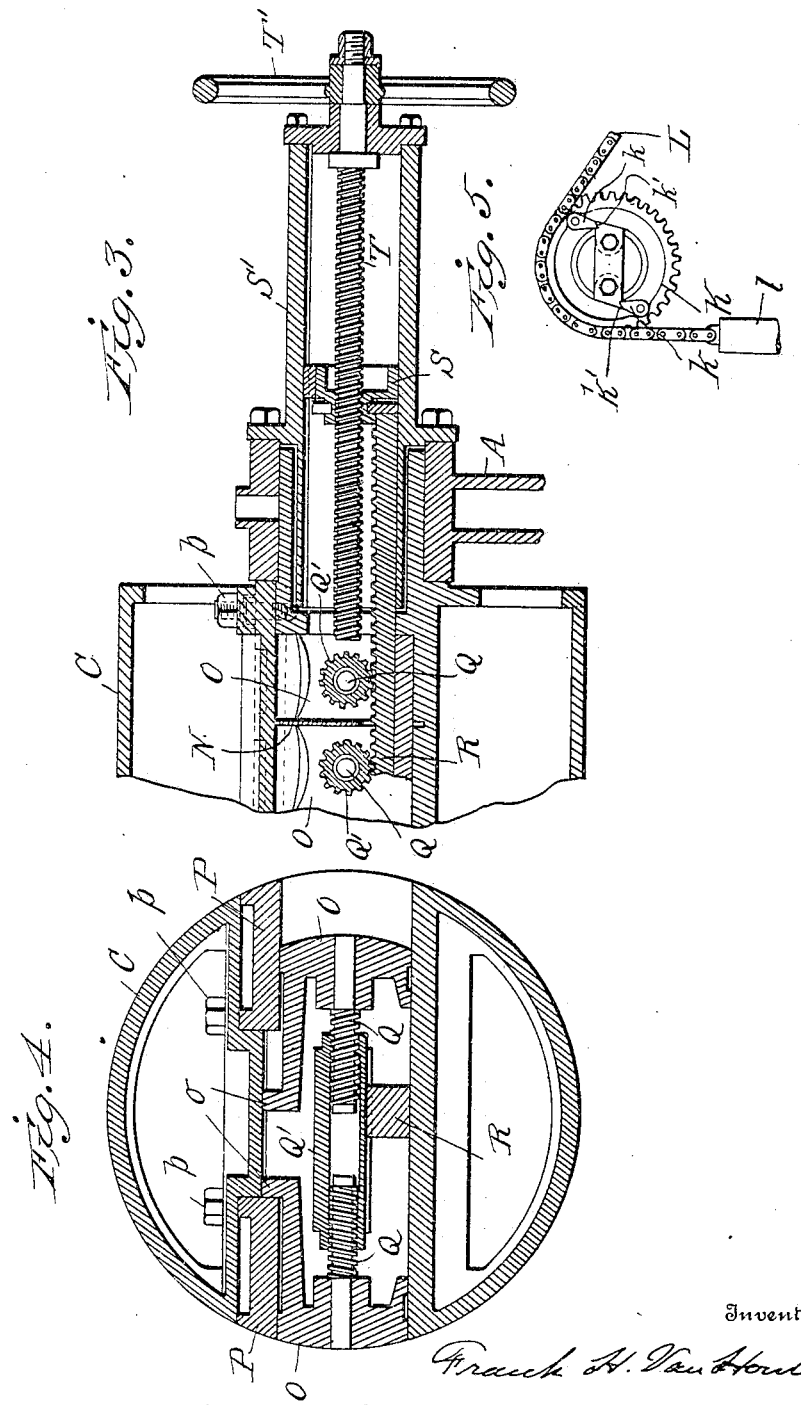

No. 788,123. Patented April 25, 1905.

UNITED STATES PATENT OFFICE.

FRANK H. VAN HOUTEN, OF FISHKILL-ON-THE-HUDSON, NEW YORK, ASSIGNOR TO DUTCHESS TOOL COMPANY, OF FISHKILL-ON-THE-HUDSON, NEW YORK, A CORPORATION OF NEW YORK.

DOUGH-DIVIDING MACHINE.

SPECIFICATION forming part of Letters Patent No. 788,123, dated April 25, 1905.

Application filed May 13, 1904. Serial No. 207,837.

*To all whom it may concern:*

Be it known that I, FRANK H. VAN HOUTEN, a citizen of the United States, residing at Fishkill-on-the-Hudson, in the county of Dutchess and State of New York, have invented certain new and useful Improvements in Dough-Dividing Machines; and I do hereby declare the following to be a full, clear, and exact description of the same, reference being had to the accompanying drawings, forming a part of this specification, and to the letters of reference marked thereon.

This invention relates to apparatus for imparting a substantially uniform density to plastic materials, such as dough, and dividing the same into parts of uniform weight, the objects of the invention being to provide a simple and effective mechanism for accomplishing the desired end and at the same time to provide for a ready manual control of the measuring mechanism to permit of its adjustment to meet the requirements of the particular batch or portion of the batch of dough passing through the machine.

The invention consists in a machine embodying certain novel details of construction and combinations and arrangements of parts, all as will be hereinafter described, and pointed out particularly in the appended claims.

Referring to the accompanying drawings, Figure 1 is a side elevation of a machine embodying the present improvements, portions being broken away and other portions shown in dotted lines. Fig. 2 is a top plan view of the machine. Fig. 3 is a section longitudinally of one end of the measuring-receptacle carrier, showing the mechanism for adjusting the capacity of the receptacles. Fig. 4 is a section in a plane at right angles to that of Fig. 3. Fig. 5 is a detail elevation of a portion of the driving mechanism for the receptacle-carrier.

Like letters of reference indicate the same parts.

In its general construction the machine embodies a hopper into which the previously-mixed batch of dough is placed, a forcing and condensing mechanism to which the dough feeds from the hopper, and a measuring mechanism into which the dough is forced by the forcing mechanism and from which the dough is discharged in a position conveniently accessible to the attendant.

Referring to the drawings, the letter A indicates the main frame of the machine, usually consisting of side pieces and cross-braces and shafts adapted to carry the working parts of the mechanism. The frame is surmounted by a hopper B, beneath which is a channel for receiving the dough and constituting a portion of the forcing mechanism. In the preferred construction said channel is rectangular and of a length equal to the length of the line of measuring-receptacles formed or mounted in a cylindrical head C. As shown in the drawings, the cylindrical head C is rotary and is provided with six measuring receptacles or chambers on each side, the series being arranged at diametrically opposite points. One of said series is adapted to receive the dough from the forcing mechanism at the time when the opposite series is discharging the dough previously received from the forcing mechanism, as will be hereinafter more particularly described.

Working within the channel of the forcing mechanism is a plunger or head D, adapted to be reciprocated through the medium of connecting-rods $d$, jointed to the plunger at each end and extending rearwardly into engagement with the upper ends of operating-levers E, preferably journaled at their lower ends in the machine-frame and oscillated through the medium of a driving mechanism embodying a connecting-rod F, extending forwardly and coöperating with a crank $f$ on a shaft $f'$. The shaft $f'$ is rotated through the medium of gears $f^2$, $f^3$, $f^4$, and $f^5$, the latter being carried on a drive-shaft G, provided with fast and loose pulleys B', as shown clearly in Fig. 2.

The connection between the upper end of the operating-levers E and the connecting-rods $d$ is a loose connection, preferably formed by slotting the said connecting-rods at $d'$, through which slots a cross shaft or pin $e$, mounted in the levers E, passes, the arrangement being such that the plunger or head D will be invariably retracted to its full limit, as indicated in Fig. 1; but the said operating-levers E may make a forward stroke without advancing the said plunger or head in a direction to advance the dough toward the measuring-receptacle.

The plunger or head D is advanced with a uniform pressure regardless of the quantity of dough confined in the channel before it by means of a weight or weights H, preferably connected, through the medium of chain or flexible connections $h'$, running over idlers $h^2$, journaled on the machine-frame at each side, with a cross head or shaft $h$, extending between the connecting-rods $d$.

In the operation of the machine it will be understood that the dough drops into the forcing-channel by gravity, and inasmuch as it might be forced back into the hopper as the plunger advances provision is made for quickly closing communication between the hopper and channel previous to or during the initial movement of the plunger or head. To accomplish this, a cut-off or blade I is provided, said cut-off working in guideways between the hopper and forcing-channel and at its outer end being preferably supported by a cross-head I', working on a guide-bar I$^2$ and adapted to receive its motion through connecting-rods $i$, jointed at their rear ends to the upper ends of cut-off-operating levers $i'$. The cut-off-operating levers $i'$ receive their motion from the main operating-levers E, and in order to effect a quick movement of the cut-off during the initial movement of the plunger said cut-off-operating levers $i'$ are provided with cam-slots $i^2$, in which spuds or projections $i^3$ on the main operating-levers are adapted to work, said cam-slots being so curved that the cut-off-operating levers and cut-off will be given a full advance stroke during the initial movement of the main operating-levers. The cam-slots $i^2$ may be continued to accommodate the full stroke of the main operating-levers; but their direction is so changed, as indicated at $i^4$, that a continued movement of the main operating-levers does not effect a further movement of the cut-off, but simply serves to lock the cut-off in its closed position.

The cylindrical rotary head C, carrying the measuring-receptacles, is journaled in bearings C' in the main frame in position for the measuring-receptacles to register with the discharge end of the forcing-channel, and it is given an intermittent rotary movement, each movement corresponding to exactly a half-revolution, whereby the diametrically opposite measuring-receptacles are successively brought into line with the forcing-channel. The movement of the rotary head preferably commences prior to the commencement of the retrograde movement of the plunger D in order that the dough pushed into the receptacles by said plunger may be held under pressure until the receptacles have moved out of line or out of communication with the forcing-channel. A convenient means for imparting this movement to the rotary head consists in providing the head with a sprocket-wheel K at one end, loosely journaled thereon and having pawls $k$, adapted to coöperate with teeth or shoulders $k'$ on the head, as shown clearly in Fig. 5 of the accompanying drawings. A chain or flexible connection L, passing over the sprocket-wheel, is connected at one end with a crank-arm M on one end of the shaft $f'$ and at its opposite end with a weight $l$. The crank M is so set with relation to crank $f$ that during the forward movement of the plunger D the head C remains at rest, the sprocket-wheel K during this period moving reversely. A continued rotation of the crank-shaft $f'$ first causes a partial rotation of the head C and then inaugurates the retrograde movement of the plunger D; but, as before stated, the relative angular position of the cranks $f'$ and M is such that the head C will be invariably rotated a sufficient distance to move the measuring-receptacles out of registry with the forcing-channel before the plunger D begins its movement.

The construction of the rotary head C and measuring-receptacles will be best understood by referring to Figs. 3 and 4, wherein it will be seen that the measuring-receptacles themselves are formed in a transverse channel extending diametrically through the head C and subdivided into receptacles of the proper dimensions by partitions N, which may be made relatively thin, so as to offer the least possible resistance to the entrance of the dough. In each receptacle there is mounted a movable head or follower O, the outer faces of said followers being preferably curved to conform to the cylindrical face of the head C and to lie flush therewith when the followers O are at the outer extreme of their movement. The outer movement of the followers O is limited by a projection $o$ on each follower, which contacts with the shoulder or abutment formed by one edge of a removable plate P, mounted in the rotary head C and held in position by bolts or screws $p$ at each end of the head. Said plate also serves as a convenient means for retaining the partitions in place.

The followers O, which are diametrically opposite to each other in the head, are connected for simultaneous movement in each direction, whereby when the dough is forced into one receptacle the follower in that receptacle is pushed back and the one in the opposite receptacle advanced, and consequently as one receptacle is filled on one side of the head the dough is discharged from the receptacle on the opposite side, this being accomplished without the necessity of providing any operating mechanism for positively moving the followers in either direction.

In order to provide for adjusting the capacity of the measuring-receptacles and to enable such adjustment to be effected during the operation of the machine, the said oppositely-arranged followers are connected together by right-and-left screw-stems Q, threaded into pinion-sleeves Q', and all of the pinion-sleeves are adapted to be rotated simultaneously by means of a rack-bar R, extending longitudinally of the head C. A movement of the rack-bar in one direction or the other will result in a simultaneous adjustment of all of the followers O and will effect a corresponding variation in the capacity of the measuring-receptacles.

As a convenient means for adjusting the rack-bar it may be connected at one end with a swivel-nut S, adapted to slide in a guide or extension S' of the frame A, said guide or extension also constituting the support for the adjusting-screw T, arranged axially of the head C and having at its outer end a hand-wheel T', which may be grasped by the attendant and the screw turned so as to adjust the rack-bar and followers O, as before described.

The hand-wheel T', it will be noted, is in convenient position to be reached by the attendant who is taking care of the measured dough, and consequently should there be a variation in the weight of the dough being delivered any time the capacity of the receptacles may be instantly adjusted by him to compensate for such variation. In the operation of machines of this character this capacity for adjustment is of great importance, inasmuch as it is found to be practically impossible to measure so as to have the measured portions always of uniform weight without making the adjustments to accord with the condition of the dough passing through the machine at that particular time. It is found, for instance, that different batches of dough or different portions of the same batch will have a different density and it is practically impossible to compress the same to a uniform density without injuring its quality.

A fixed scraper U may be provided for insuring the discharge of all the dough, and as the surface of the followers conforms to the cylindrical surface of the head there is no chance of any dough adhering after the receptacles pass the discharge-point.

Having thus described my invention, what I claim as new, and desire to secure by Letters Patent, is--

1. In a dough-divider, the combination with a hopper, a channel for receiving dough therefrom, a measuring-receptacle adapted to aline with said channel and a reciprocatory plunger for discharging the dough from said channel into the measuring-receptacle, of an oscillating lever, a driven crank-shaft for oscillating said lever positively in both directions, a loose connection between the lever and plunger whereby the lever is free to advance without affecting the plunger and a weight connected with said plunger for advancing the plunger when relieved of the restraining influence of the lever.

2. In a dough-divider, the combination with a hopper, a channel for receiving dough therefrom, a measuring-receptacle adapted to aline with said channel and a reciprocatory plunger for discharging dough from said channel into the receptacle, of an operating-lever pivoted at one end, means for positively reciprocating said lever in both directions, a connecting-rod intermediate said lever and plunger, a loose connection between said connecting-rod and lever, a weight and a connection between said weight and connecting-rod, for advancing the plunger when unrestrained by the operating-lever; substantially as described.

3. In a dough-divider, the combination with the hopper a channel for receiving dough therefrom, a measuring-receptacle adapted to aline with said channel, a reciprocatory plunger for discharging the dough from said channel into the measuring-receptacle, a weight for advancing said plunger, a positively-reciprocated operating-lever for retracting the plunger, a cut-off for closing communication between the hopper and channel and connections between said cut-off and operating-lever whereby movement is imparted to the cut-off.

4. In a dough-divider, the combination with a hopper, a channel for receiving the dough therefrom, a measuring-receptacle adapted to aline with said channel and a reciprocatory plunger for discharging the dough from said channel into the receptacle, of a weight for advancing the plunger, an operating-lever for retracting the plunger, a cut-off for closing communication between the hopper and channel and a cut-off lever having a cam-groove, a projection on the operating-lever working in said cam-groove and adapted to impart a full closing movement to the cut-off during the initial advance movement of the operating-lever; substantially as described.

5. In a dough-divider, the combination with a forcing mechanism embodying a reciprocatory plunger, a weight for advancing the plunger and a driving mechanism for retracting the plunger, of a measuring-receptacle adapted to receive the dough from the forcing mechanism, a cut-off adapted to advance in the same direction as the plunger for closing the feed-opening to the forcing mechanism and means for imparting an accelerated closing movement to the cut-off during the initial movement of the plunger; substantially as described.

6. In a dough-divider, the combination with the hopper, channel and measuring compartment for receiving dough from the channel, of the reciprocatory plunger working in the channel, the reciprocatory cut-off for closing communication between the channel and hopper and driving mechanism for reciprocating the plunger and cut-off simultaneously in the same direction but at different speeds whereby the cut-off is closed during the initial movement of the plunger; substantially as described.

7. In a dough-divider, the combination with the hopper, channel and measuring compartment for receiving dough from the channel, of the reciprocatory plunger working in the channel, the cut-off for closing communication between the hopper and channel, said plunger and cut-off being adapted to advance simultaneously in the same direction, oscillating levers connected respectively with the plunger and cut-off, and a driving mechanism with connections for imparting to the cut-off lever an initial accelerated movement; substantially as described.

8. In a dough-divider, the combination with the forcing mechanism, of a measuring mechanism embodying a rotary head having a plurality of receptacles therein, followers in said receptacles and mechanism for adjusting said followers simultaneously, extending longitudinally of the axis of the head and provided with a controlling part or hand-wheel outside of the head; substantially as described.

9. In a dough-divider, the combination with the forcing mechanism, of a measuring mechanism embodying a rotary head having a plurality of pairs of oppositely-located receptacles therein, followers in said receptacles, adjusting-screws connecting the followers in each pair of receptacles and an operating mechanism extending longitudinally of the axis of the head for adjusting all of said followers simultaneously, substantially as described.

10. In a dough-divider, the combination with the forcing mechanism, of a measuring mechanism embodying a head having measuring-receptacles therein and journaled to move said receptacles into and out of registry with the forcing mechanism followers in said receptacles and adjusting mechanism for said followers embodying transverse adjusting-screws, an adjusting-screw arranged axially of the head and gearing intermediate said transverse and axial screws; substantially as described.

11. In a dough-divider, a measuring mechanism embodying a cylindrical head journaled at each end and having a series of diametrically-arranged receptacles therein, followers in said receptacles, the followers on opposite sides being adjustably connected for simultaneous movement, and an adjusting mechanism for said followers having a controlling part projecting through the journal at one end of the head; substantially as described.

12. In a dough-divider, a measuring mechanism embodying a cylindrical head journaled at each end and having a series of diametrically-arranged measuring-receptacles therein followers in said receptacles, screw-stems on said followers pinion-sleeves connecting said stems, and a bar for rotating said sleeves arranged longitudinally of the head; substantially as described.

13. In a dough-divider, a measuring mechanism embodying a cylindrical head journaled at each end and having a series of diametrically-arranged measuring-receptacles therein, followers in said receptacles, screw-stems on said followers, pinion-sleeves connecting said stems, a rack-bar engaging said sleeves and a screw extending out at one end of the head for adjusting said rack-bar and followers; substantially as described.

14. In a dough-divider, a measuring mechanism embodying a cylindrical head having a series of measuring-receptacles therein, followers in said receptacles having projections thereon and a removable plate in said head constituting a stop coöperating with said projections for limiting the outward movement of the followers; substantially as described.

15. In a dough-divider, a cylindrical measuring-head, having a channel formed diametrically through the same, removable transverse partitions in said channel to divide the same into receptacles, and means for retaining said partitions in place; substantially as described.

16. In a dough-divider, a cylindrical measuring-head having a channel formed diametrically through the same, removable transverse partitions in said channel to divide the same into receptacles, followers in said receptacles and a removable plate for holding the partitions in place and limiting the outward movement of the followers; substantially as described.

17. In a dough-divider, the combination with the hopper, channel-plunger and rotary head having diametrically-arranged measuring-receptacles therein, of the driving mechanism for the plunger and head embodying a crank-shaft having cranks set at an angle with relation to each other for operating the plunger and head, and whereby the head is rotated to move the receptacles therein out of registry with the channel before the retrograde movement of the plunger commences; substantially as described.

FRANK H. VAN HOUTEN.

Witnesses:
ALICE M. KEANE,
CLAUDE VAN NOSTRAN.